United States Patent [15] 3,678,621
Reams [45] July 25, 1972

[54] HORTICULTURAL METHOD FOR GIVING SEEDS, PLANTS AND HARVESTED ITEMS HYGROSCOPIC CHARACTER DURING ARID CONDITION

[72] Inventor: Robert M. Reams, Rte. 2, Apex, N.C. 27507

[22] Filed: July 1, 1970

[21] Appl. No.: 51,657

Related U.S. Application Data

[63] Continuation-in-part of Ser. No. 794,799, Jan. 28, 1969.

[52] U.S. Cl. ..........................................47/58, 71/27, 71/33, 71/63, 71/65, 71/68, 47/DIG. 9, 47/DIG. 2, 21/58
[51] Int. Cl. ......................A01h 5/04, A01n 3/02, A01n 5/00
[58] Field of Search..............47/58, DIG. 2, DIG. 9, DIG. 11; 71/27, 33, 63, 65, 68; 21/58

[56] References Cited

UNITED STATES PATENTS

| | | | |
|---|---|---|---|
| 2,168,304 | 8/1939 | Meyer | 47/58 UX |
| 2,230,931 | 2/1941 | Bussert | 47/58 UX |
| 2,770,538 | 11/1956 | Vierling | 71/29 |
| 2,923,094 | 2/1960 | Ryan | 47/58 |

Primary Examiner—Robert E. Bagwill
Attorney—B. B. Olive

[57] ABSTRACT

A hygroscopic character, i.e. the ability to take up and retain water, is given seeds, bulbs and plants during arid growing conditions and to cut leafy vegetables, cut trees, cut flowers and the like after being cut by the method of applying a material in powder or solution form selected from the group comprising magnesium carbonate, sodium citrate, magnesium chloride, magnesium pyrophosphate and citric acid, with magnesium carbonate being preferred.

34 Claims, No Drawings

HORTICULTURAL METHOD FOR GIVING SEEDS, PLANTS AND HARVESTED ITEMS HYGROSCOPIC CHARACTER DURING ARID CONDITION

CROSS REFERENCE TO RELATED APPLICATION

This application forms a continuation-in-part of allowed copending application Ser. No. 749,799, "Plant Transplant Solution and Method", filed Jan. 28, 1969 by the same inventor and now pending in Group Art Unit 337. The referred to copending application is being abandoned upon the filing of this application.

PRIOR ART RELATED TO TRANSPLANTS

In one aspect of the prior art it is noted that many crops, e.g. tobacco, tomato, cabbage, corn, lettuce, cauliflower, peppers, etc. are propagated by the planting of seeds in fields. Other crops, e.g. flowers, start from both seeds and bulbs. If unfavorable weather conditions exist at the time of planting, such as hot, dry or windy weather or if unfavorable soil conditions exist such as having a dry soil, the seeds and bulbs undergo considerable stress due to lack of water intake and to evaporation of water from the soil. In another and related aspect of the prior art the germination of seeds in soils is impossible or the yield is too low as to be negligible when the soil is substantially dry or the moisture content is below a certain level that will vary with the type of seeds, soil and other factors. Similar observations may be made with regard to the germination of bulbs and the word "seeds" is used to mean both 'seeds' and 'bulbs'. The prior art has thus not provided any means for rendering seeds or bulbs more hygroscopic in nature so as to make practical germination of seeds and bulbs in such dry soils. The same applies to seed potatoes.

In another and related aspect of the prior art, the removal of rooted plants, e.g. tobacco, tomato, cabbage, pepper, cauliflower, flower plants etc., from seedbeds involves the breaking of many feeder roots which normally supply water and nutrients to the plant. If unfavorable weather or growing conditions exist at the time of transplanting, such as hot, dry, windy weather or dry soil, the plant undergoes a great deal of stress due to lack of water intake and to evaporation of water from the leaves during the transplant period.

As to plants being transplanted it may be further noted that the normal protective device which prevents excessive evaporation from the leaf is the stomata, or openings to the leaves, through which water is discharged from the leaf. Evaporation causes the roots to draw in more water containing nutrients to support growth of the plant. The process of osmosis causes the nutrients and water to move to the leaves from the roots and the process of imbibition causes the roots to draw in water from the soil. When evaporation endangers the life of the plant, the stomata, which are protected by a pair of guard cells, are affected by the loss of normal turgidity, a term referring to plants which have sufficient moisture content. The loss of turgidity of the guard cells causes them to collapse and to reduce the size of the opening. According to some prior art practices where the leaf of the plant has been dipped with an impervious layer forming solution, e.g. wax or plastic solution, the treatment obtained is primarily a mechanical coating and though there may be stoppage of the leaf openings (stomato), the physiological moisture control obtained by the root dipping procedure of the invention is not obtained.

Since the stomato are the "lungs" of the leaf, and must allow the entrance of $CO_2$ and other gasses from the atmosphere to enter the leaf, as well as allow excess water to leave, the stomato must not remain closed too long. However, without closure during stress periods the stomato may discharge enough water to the point that the plant is damaged or killed. Plant mortality is therefore related to this action of the stomato. So far as is known there has been no practical plant dip solution or method which could be applied at the time of transplanting and that could be relied on to provide a hygroscopic character and thereby substantially reduce transplant mortality.

Independent of the need for improved hygroscopic character during seed germination, and during the transplant period it will be apparent that while satisfactory moisture conditions may prevail during seed germination and at the time of transplanting such conditions may change and may not prevail when the plant is actually growing and for this need the only prior art practices has been to use water irrigation techniques in the fields. Thus, a need exists for a treatment directed to improving the hygroscopic character of growing plants irrespective of whether the seeds or plants, at the time of transplanting, have had such a treatment.

In another related area of horticultural practice, it may be noted that cut Christmas trees, fir and cedar, and cut flowers lose their freshness and become dry and dead shortly after being cut. One solution provided by the prior art is to stand the flowers or trees in a receptacle of water but even this does not render the cut plants or trees hygroscopic nor does it substantially extend the life. Another practice has been to coat the stumps of cut trees and flowers with wax or the like. In a further related aspect of the invention, freshly cut vegetables, e.g. collards, cabbage, spinach and the like very quickly dry out on the store shelf but the common prior art practice of spraying shelved vegetables with water does not induce a hygroscopic character in the cut vegetables and does little to maintain their freshness.

Since the present invention centers around the discovery of certain unforeseen and previously unknown hygroscopic producing properties of certain materials particularly of magnesium carbonate it may be mentioned that magnesium carbonate has been employed for horticultural purposes but not in the manner of the invention. In U.S. Pat. No. 1,951,752 for example the method described uses magnesium carbonate as a buffer compound to neutralize the acidity caused by the decomposition of ammonium sulphate fertilizers, the latter being acid forming. Thus the magnesium carbonate reacts with the ammonium sulphate to retain the soil pH at a stable level. Limestone is described, and dolomitic limestone contains a portion of magnesium carbonate though the magnesium content is not mentioned. In U.S. Pat. No. 1,747,281 there is shown a technique utilizing magnesium carbonate for the production of $CO_2$ in the proximity of the plant to stimulate plant growth. Magnesium carbonate is primarily employed as a cheap way of getting the carbonate radical into the soil along with aluminum sulphate to release $CO_2$ into the immediate atmosphere. Other patents cited to show the state of the art include U.S. Pat. Nos. 2,168,304, 2,230,931, 2,770,538 and 2,923,094.

SUMMARY OF THE INVENTION

From what has been stated with respect to application of the materials and method of the invention to plants two possible processes for reducing the loss of transplanted plants have been recognized: The theory of the first process is that by adding nutrients to the roots those soluble compounds which are capable of supporting the process of imbibition will be supplemented and the taking in of water from the soil will be increased sufficient to reduce the death of plants from evaporation. The theory of the second process is that by the addition of nutrients to the roots they will be absorbed by the roots and such nutrients will be translocated through the stem to the leaves in sufficient level to cause the plant to go into premature shock. By this is meant that the guard cells in the stomato will be closed prematurely to reduce the ability of the plant to permit water to be evaporated from the leaf, thus, conserving such water as may have been contained in the plant at transplanting time.

According to the invention either or both of the above described processes are believed to be effected by dipping the plant roots or in some cases by dipping the plant foliage, prior to transplanting, in an aqueous solution of either magnesium carbonate, sodium citrate, magnesium chloride, magnesium pyrophosphate or citric acid with magnesium carbonate being preferred. What actually happens is not clearly understood but it is clear that the hygroscopic character, i.e. the ability to absorb and retain water is improved and that one or both of the above described or equivalent processes take place since extraordinary, and completely unexpected results have been achieved in the way of drastically reducing plant mortality following transplanting and under varying weather conditions.

In another aspect of the invention the hygroscopic character and germination of seeds has been markedly improved, particularly in dry soils, using the mentioned materials, preferably magnesium carbonate, and the method employed with respect to the above mentioned plants. In a further aspect of the invention the growth and fruiting of growing plants has been substantially improved and in cases where neither the seeds nor the plants during transplanting had been previously treated according to the invention. In a still further aspect of the invention, the hygroscopic character and life of cut Christmas tress, cut vegetables and cut flowers has been improved through use of the same basic materials and method mentioned in connection with the plants.

The object is therefore to provide, particularly under dry conditions a method for improving the hygroscopic character of seeds, bulbs, transplant plants, growing plants, cut trees, cut flowers and cut vegetables.

Other objects and advantages will appear as the description proceeds.

DESCRIPTION OF THE INVENTION

I. Application To Seeds And Bulbs

As previously mentioned the invention provides the means for improving germination of seeds and bulbs by dipping the seeds or bulbs in a 100 percent or 25 percent saturated magnesium carbonate solution or by stirring the seeds or bulbs directly in the powder. In one example three lots of garden peas, 50 seeds in each lot, were treated according to the invention. Lot 1 was dipped for one minute in a saturated magnesium carbonate solution made up in the ratio of 1 gram magnesium carbonate powder to one quart of water (called a "100 percent solution" for reference). Lot 2 was dipped for 1 minute in a magnesium carbonate solution made up in the ratio of 1 gram magnesium carbonate powder to one gallon of water (called a "25 percent solution" for reference). Lot 3 was dipped for one minute in plain water. All three lots were allowed to dry for two days and were then planted in a plastic greenhouse in very dry soil at a mean soil temperature of 40° F. In all examples the soil used was a standard blended soil of uniform moisture and organic content prepared according to normal horticultural test practices. Thirteen days after planting 68 percent of those seeds in Lot 1 had germinated and averaged 2 inches in height, 32 percent of those seeds in Lot 2 has germinated and averaged 1 inch in height, and 12 percent of those seeds in Lot 3 has germinated and averaged one-fourth inch in height. In another test three lots of mustard seed were planted under similar, dry soil conditions and it was found that a 25 percent saturated solution of magnesium carbonate proved most effective in improving germination.

Additional tests have been run using pine, tobacco, collard, corn, lettuce, pepper, pole beans, soy beans, tomato, cabbage, cantaloupe, watermelon, cucumber and turnip seeds. In one test tomato seeds were immersed in a 100 percent saturated solution of magnesium carbonate for one minute, dried and then planted in dry soil about one-half inch deep. In another test the tomato seeds were shaken in a container filled with dry powdered, magnesium carbonate, applied at the rate of 1 gram per quart of seed, and then planted in dry soil in the same manner. The tests were repeated with the initial moisture of the soil varying from test to test. Similar tests were run on tobacco, corn, lettuce, pepper, pole beans, cabbage and watermelon seeds. In all instances where the soil moisture was adequate the treatment of the invention had no effect. Where the soil moisture was moderate, the seeds treated with a 100 percent solution according to the invention germinated earlier than the untreated seeds but the untreated seeds caught up later. However, where very low moisture soil was used the plots treated with a 100 percent solution sprouted earlier and maintained about a 2 to 1 ratio of germination favoring treatment. The advantage of treatment was as much as 4 to 1 in cases of very low initial moisture.

It has been found that some seeds, particularly hard seeds, do better with higher concentration, i.e. 100 percent solution, whereas soft seeds absorb faster and require the lower 25 percent solution. The average time in solution is preferred about one minute though a quick, e.g. ten second, dip proves effective with certain seeds. Peanut seeds in particular favor use of the dry powder because the coat cracks. Soy beans, mustard, turnip, collard, cantaloupe and cucumber seeds appear to do best with a 25 percent solution and the other seeds listed, except for peanuts, appear to favor the 100 percent solution.

With regard to the use of a wet solution and the step of drying, garden seed are not required to be thoroughly dried and can be planted almost immediately after treating. However, seed for machine planting or storage should be thoroughly dried. The drying step is of course not necessary where the seed or bulbs are simply mixed and stirred with the magnesium carbonate powder. Collard, peanut, corn, soy beans, turnip and mustard seeds have been successfully treated with the powder and while 1 gram of powder to 1 quart of seed, or 1 ounce to one bushel of seed, will produce the results even a substantially lesser amount of the powder produces very marked changes in the hygroscopic character of the seeds or bulbs.

Gladiola bulbs were dipped in the 100 percent magnesium carbonate solution and planted alongside untreated bulbs in a sandy, lome type soil during a dry period of weather. The treated bulbs appeared in about two weeks time whereas the untreated bulbs appeared in about four weeks. Very small petunia seed were sprayed with a 100 percent magnesium carbonate solution after being planted and the results were obtained. The invention method has also been found applicable to various flower seeds including zinnias, chrysanthemums, salvia, impatiens and petunias. Seed Irish potatoes were dripped in a 100 percent magnesium carbonate solution, immediately drained and planted, along with untreated seed potatoes, under dry conditions and the results were obtained. Sweet potatoes being bedded for growth of potato slips were planted in dry weather and were sprinkled with a 100 percent magnesium carbonate solution prior to covering and were planted along with untreated bed potatoes with very noticeable differences in growth and germination.

In other tests carried out as above there was employed instead of magnesium carbonate a material selected from the group consisting of magnesium phosphate, magnesium chloride, citric acid and sodium citrate. These materials produced essentially the same results when made up in a saturated solution and then diluted, 1 part solution to 3 parts water. In no case with magnesium carbonate or any of the alternate materials has there been evidence of harm to the seeds. Magnesium chloride however was found practical only in solution form.

Experiments have also been undertaken with regard to indirect application and directed to mixing the magnesium carbonate or other material with powdered inoculants and with liquid and slurry fungicide and applying this mixture to the seeds or bulbs. Evidence has been obtained that when the same concentrations are maintained as when directly applied, the method and materials of the invention produce the same results. With some types of bulbs and seeds very minor concentrations of one of the materials produces marked changes in the hygroscopic character of the seeds and bulbs. The effectiveness of the inoculants and fungicide are also improved.

From the above it can be seen that many advantages are derived from the treatment of the invention as applied to seeds and bulbs. The greatest benefit derives from the increased rate of germination under very low moisture levels. However, even when moisture levels are high enough to permit normal germination full germination may be achieved as much as 2 days earlier than otherwise. This advantage will permit seeds to emerge after heavy rains and before hard crusts have had time to form. Of practical importance is the fact that conventional planting procedures may be employed and the amount of treatment material may be easily controlled. Since the invention applies to both what are thought of as seeds as well as bulbs and including seed Irish potatoes, seed sweet potatoes and the like, the word "seeds" in the claims is used in such a generic sense.

II. Application To Plants During Transplant and Post Transplant Growth Stages

According to the invention as applied to transplanted plants at the time of transplanting, a substantially saturated magnesium carbonate ($MgCO_3$) solution is made up by mixing the magnesium carbonate with ordinary water in the preferred ratio or concentration of 1 ounce of magnesium carbonate ($MgCO_3$) per That 8 gallons of water. Once the desired quantity of solution has been prepared the plant roots are dipped in the solution and covered, in the case of tobacco plants, to a depth of 2 to 3 inches according to the plant size but without allowing the bud or upper foliage to contact the solution. The reason for not dipping the bud and upper foliage is that it has been found that the solution, unlike its effect on the roots, tends to dry up the bud and leaf portions of the plant if either is contacted with the solution. The plant roots are held immersed for a brief time in the order of 10 seconds in order to soak the roots with the solution. This is it is desirable that the dipping time be sufficient for all plants to which the invention finds application.

Following the dipping of the plants in the solution, the roots are drained and the plants are then immediately transplanted in the usual way according to the type plant involved e.g. tobacco, tomato or the like. The results to be observed following transplanting will vary with weather, type of plant and other growing conditions. However, in all cases a much lower than normally experienced mortality rate has been observed and proven by planting simultaneously treated and untreated plants in the same plots with all conditions being the same except for use of the transplant solution. Not only has there been a reduction in mortality but it has also been possible to observe in the case of tobacco and tomato plants a substantially faster and more uniform growth of the transplanted plants particularly where good moisture conditions prevail. Treatment with the solution in one test and subsequent planting of the tobacco plants under virtually bone dry conditions and without use of water during transplanting resulted in a completely unexpected low mortality among the treated plants as compared to extremely heavy losses among the untreated plants. The treated plants showed earlier flopping on the day following transplanting than the untreated plants but on successive days, usually by the third day, the treated plants stood erect.

Special precautions were taken to provide unbiased lots of plants for testing. The tobacco plants were selected from those remaining on plant beds at the planting date according to standard size, color, and condition, then after pulling they were graded and selected for uniform root size and condition without broken tap roots. The number of plots was determined and the plants were sorted consecutively into this number of piles with a constant rotation around the grading one plant at a time to reduce chances of error due to condition of plants before planting. Then the roots were dipped with magnesium carbonate solution and planted as previously explained. The plants were planted under rather dry conditions without water, using a slide type tractor transplanter.

According to such tests as have been completed particularly on tobacco plants the losses among treated plants have been demonstrated to be 25 to 50 percent of those among the untreated plants. Furthermore, the more rapid and more uniform grow-off in the treated tobacco or tomato plants offer economic advantages both in value of the harvest and in being able to cultivate a uniform type plant in the field during subsequent farming operations.

In a test run on tomato, collard and a variety of flower plants, e.g. zinnias, chrysanthemums, salvia, impatiens and petunias, extremely dry soil was selected. The plants were graded according to size and root development and divided into lots for replicated planting. The roots only of one-half of each grouping was treated with the solution and all plots were transplanted with a hand transplanter, using very little water. All treated plots were able to survive and grow off far better than the untreated ones. Untreated plots generally died at the rate of twice that of the treated plots. The exception to this was the tomatoes, where survival in treated plots was four times that of untreated plots.

As previously suggested the reasons why the described transplant solution and method of application produce such unexpected and unusual results are not understood. Either water intake is increased through the roots or premature shock, including closure or partial closure of the stomata is induced. To further explain the possible processes, reference is made to the book "Botany" by Robbins & Rickett, 1939, D. Van Nostrand and Co., publisher. Whatever the processes it is apparent that very startling reductions in plant mortality can be achieved simply by applying the magnesium carbonate solution in the concentration and manner stated. A further advantage of the invention is that the magnesium carbonate can be produced, made in solution and handled safely since in the definition of the U.S. Department of Agriculture such material does not constitute an "economic poison" and therefore requires no special label or handling cautions.

While the normal practice with the invention solution is to dip the plants and immediately replant it has been found that the dipped plants may be stored in the order of 24 to 48 hours without harm provided storage is under cool, moist conditions and where storage is over 24 hours the plants should be dipped in plain water before transplanting.

In certain tests conducted with the solution of the invention the conditions have been so severe as to cause the death of all untreated plants. These however have not been deemed the most conclusive or the most accurate tests because of the abnormal conditions. It is also of interest to note that no specimen noted thus far has been damaged by employing the solution of the invention in the manner set forth.

While the main purpose of the invention as applied to transplants is that of assisting the plant through the period immediately following transplanting it is desirable particularly in the event of drought conditions to reduce transpiration in growing plants after the transplant period. The same root dip solution of the invention, i.e. a substantially saturated magnesium carbonate solution made up of 1 ounce of magnesium carbonate per 64 gallons of water (a "10 percent" solution) if sprayed over the plant after the transplant period, i.e. after the planted plant has rooted and is growing, will cause the plant to retain substantially more moisture. The after transplant, moisture retaining spray may also be obtained with the same concentration of substantially saturated solution made up with sodium citrate ($Na_3C_6H_5O_7 \cdot 2H_2O$). Thus by using the same substantially saturated, magnesium carbonate solution as a root dip during transplanting and later, after the transplanting period as a plant spray, the plant moisture is retained during two of its most critical periods of growth. Alternatively, the substantially saturated magnesium carbonate root dip solution may be used for moisture control during transplanting and the described substantially saturated sodium citrate solution may be used either immediately after the transplant period or during the period of advanced growth as a plant spray to effect moisture retention. Particularly with regard to the magnesium carbonate solution it might have been expected that harm would be caused by spraying such a solution on the plant leaf after the transplanting period since if used prior to transplanting harm is, as previously mentioned, caused if portions of the plant other than the roots are dipped. Nevertheless, it has been discovered that beneficial results through physiological changes can be obtained if the described magnesium carbonate solution is used as a root dip only and later in the plant history as a plant spray.

The use of the described magnesium carbonate solution either as a substantially saturated root dip applied immediately after pulling or as a subsequent 10 percent post-transplant spray applied during plant growth is deemed the preferred embodiment. However, it has been discovered that physiological changes similar to those obtained by use of the magnesium carbonate solution can be induced and the moisture retention of certain plants, particularly tobacco plants, can be enhanced by dipping the leaf portion only of the plant in the described substantially saturated sodium citrate solution after the plant has been pulled from the seedbed and prior to transplanting. Test plots following this last pre-transplant, leaf dip method and using tobacco plants being transplanted have shown results generally comparable to those obtained with use of magnesium carbonate. The sodium citrate solution has also been found useful as previously mentioned as a plant spray. The invention thus provides solutions having the common character of substantially improving moisture retention by inducing physiological changes in contrast to the conventional mechanical coating solutions and both of which are applicable to tobacco and other plants. While the discovered solutions are known to produce the results described it is believed that the greatest contribution of the present invention will prove to be that of directing the efforts of others along the route of what is believed to be a new discovery in plant treatment namely that certain materials in certain solution or powder form when handled by certain methods can safely, practically and economically induce physiological changes sufficient to substantially improve moisture retention during seed germination and in both the transplant shock period as well as during the post-transplant growth period.

As previously mentioned, a magnesium carbonate solution is deemed the preferred embodiment and the preferred means for inducing the described physiological change. Within the scope of the invention for inducing an equivalent physiological change during transplant and post-transplant stages and by such means reducing evaporation are two additional magnesium compounds and another citrate radical compound. For example, when a substantially saturated solution of either magnesium chloride or magnesium pyrophosphate is made up in the same concentration and is applied as a root dip during transplanting in the same manner as the previously described saturated magnesium carbonate solution a substantially similar physiological change and evaporation reduction are obtained. Further, when one of the mentioned materials, e.g. citric acid, is applied as a top or foliage dip as a post transplant step in a similar concentration and manner of application as the previously described sodium citrate solution, a substantially equivalent physiological change and evaporation reduction is obtained thus leading to a substantial reduction in plant mortality. Various practical considerations favor use of the magnesium carbonate solution however it can be seen that the several mentioned compounds give the operator a rather wide choice of materials.

What has been separately discovered is that growing plants, in the even of dry weather, are given a markedly improved hygroscopic character by a treatment with one of the materials of the invention apparently at any stage of growth and irrespective of whether the seeds which produced the plants were treated with a material of the invention and irrespective of whether the roots of the plants during transplant were so treated and irrespective of whether the young plant foliage was so treated at the immediate beginning of plant growth following transplant. That is, it has been discovered that treatment, during the normal growth period, of growing plants according to the invention acts independently of past treatment of the seeds or plant roots or very young plant foliage and with somewhat different and unexpected results.

To illustrate, the foliage of a group of about 1 foot high tomato plants growing in the Piedmont section of North Carolina during a period of dry May weather were simply sprayed with a partially saturated magnesium carbonate solution, made up with approximately one-tenth gram magnesium carbonate per quart of water; and another adjacent group of plants were left untreated. Four weeks later, following a substantially continuing period of dry weather, the treated tomato plants showed heavy fruiting of tomatoes averaging 4 inches in diameter. The untreated plants showed about one-half as much fruit and with the fruit less than one-half as large. It should be noted that neither the seeds which grew the plants nor the plant roots during transplanting nor the plant foliage had been treated with a material of the invention until the aforementioned treatment when the plants were about 1 foot high. This fact indicates that dramatic changes in the hygroscopic character of mature, growing plants can be effected by the treatment of the invention during dry weather. From other experiments, it is indicated that any of the mentioned materials of the invention will produce the same results.

As background information for another aspect of the invention, it may be noted that various insecticides such as those sold under the names Sevin (a carbaryl), malathion and parathion (U.S. Department of Agriculture designations) are essentially ineffective in dry weather even when applied in aqueous solution. For example, if such insecticides are on a plant during a dry period the worms and insects are not disturbed but often are immediately killed if there comes even a slight rainfall. Quite unexpectedly it has now been found that if one of the materials of the invention are applied with such insecticide during dry or relatively dry weather the insecticide is effective. In one test approximately one ounce of magnesium carbonate was added to a 55 gallon drum of water also containing approximately 2 quarts of parathion emulsion and this insecticide mixture was sprayed on growing collard plants, infested with collard worms, during a prolonged period of dry weather. Not a single living worm was found the next day. The Selvin, malthion and parathion insecticides are indicated to be equally effective when used with any of the listed materials of the invention. Such insecticides can be applied in powder, wettable powder-suspension, or emulsion liquid form, and the effectiveness of the insecticides in dry weather are indicated to be obtainable by mixing any of such forms of insecticides with any one of the materials of the invention, magnesium carbonate being preferred, and applying the mixture as a dust or spray.

In considering the foregoing it might be noticed that the treatment of the invention in effect and very unexpectedly causes two highly compatible changes in plant character. That is, the plant is given an improved character both for absorbing water as well as an improved character for retaining water. Thus, once the water gains entry into the plant by the first characteristic the second characteristic instead of enhancing evaporation tends to preserve and retain such water thereby giving the plant a multiple modified hygroscopic character.

By identifying at least five specific compounds namely, magnesium carbonate, magnesium phosphate, magnesium chloride, citric acid or sodium citrate which cause the aforesaid change in characteristics it can be seen that others skilled in the art may now easily search for other compounds of comparable character. It is to be expected then that others skilled in the art will discover other compounds which when placed in aqueous solution and applied as a dip during a period of dry weather will produce the same results as those obtained by the method of the present invention.

III. Application To Cut Trees

The treatment of the invention as applied to cut and decorative trees, e.g. Christmas cedar trees, has produced results as unexpected as those obtained with seeds, plants and cut flowers. In particular three lots of trees were tested immediately after cutting. Lot 1 had the cut tree stumps dipped in dry powdered magnesium carbonate, Lot 2 had the cut tree stumps dipped in a thick slurry formed by a suspension of magnesium carbonate in water, and Lot 3 had the tree stumps untreated. The trees were than hung in a heated green house at an approximate temperature of 70° F. and left for 5 days at which time all showed evidence of dehydration. The trees were then weighed and placed in plain water and left for 24 hours and were weighed again to determine water intake. It was found from these tests that the treated trees had substantially reduced dehydration and furthermore were able to make a substantial absorption of water even after advanced dehydration. The untreated trees, in comparison, after being dehydrated had essentially no capacity to absorb water.

In a further test on cut cedar trees, one lot of trees was cut and immediately after cutting the stump of each was bagged with a plastic bag containing a saturated magnesium carbonate solution. A second lot was cut and the stump of each was bagged immediately after cutting with a plastic bag containing plain water. In both cases the liquids were replenished as rapidly as absorbed by the tree and the trees were periodically weighed over a period of about 4 weeks. In this test it was shown that the magnesium carbonate solution is absorbed at a rate about 50 percent faster than plain water. However, the magnesium carbonate treated plants evaporated water at a rate less than half of that of the trees treated with plain water. The magnesium carbonate treated trees were shown to have the capability of retaining their original or higher moisture content for upwards of twenty days which of course substantially reduced the fire hazard and enhanced their general appearance and beauty.

In another test two lots of three trees each were chosen and immediately after cutting the stumps of the three trees in one lot were bagged in a plastic bag filled with sufficient plain water to encompass the stump. The whole of each tree was further encased in a second plastic bag which collected all evaporated water and placed each tree in effect in a closed environment. A hypodermic type needle was used to penetrate both bags and to replace water as needed in the inner bag. The trees were suspended in a plastic greenhouse during late Fall weather in Piedmont North Carolina and in which temperatures were generally moderately warm during the day and cool at night. Each of the three trees in the second lot were encased and suspended in the same greenhouse. However, the trees in the second lot were fed and kept supplied with a saturated magnesium carbonate solution. Weights were periodically taken and the tests extended over a period of about 45 days. This set of tests showed that the trees in plain water in the first lot ceased to absorb water in 28 days and evaporated water at a substantially higher rate than the treated trees in the second lot. The treated trees in the second lot continued to absorb water for approximately 42 days and evaporated water at a substantially less rate than the trees in the first lot. Thus, the effects of the method of the invention were dramatically proven.

IV. Application to Cut Flowers

As previously mentioned the treatment of the invention provides a hygroscopic character both to plant life as well as to harvested life, e.g. cut flowers.

In connection with cut flowers, tests have been run on carnations and chrysanthemums. In the case of the carnations, a group of cut flowers immediately after cutting were dipped for one minute in a saturated magnesium carbonate solution and then placed in a vase with plain water added. Another group of carnations were placed in a vase immediately after cutting and a saturated magnesium carbonate solution was then poured into the vase. A third group were placed in a vase immediately after cutting with water only. All of the vases were left in a room at 70° F. temperature and were observed for wilting. The first group wilted 10 days after treatment, the second group 8 days after treatment and the third group 6 days after treatment. These test conclusively show the improvement in the hygroscopic character of the cut plants.

In a test conducted with pom-pom chrysanthemums, the purpose was to determine whether the treatment of the flowers according to the invention for about 1 hour would increase the useful life of the flowers when out of a liquid medium such as during storage or in use as a corsage. One group immediately after cutting was dipped in warm saturated magnesium carbonate solution for five minutes and was then placed in warm water for 1 hour. A second group immediately after cutting was dipped in supernatant of saturated magnesium carbonate solution for 1 hour. A third group was dipped in plain water for 1 hour, then all three groups were removed from the media and placed in a dry vase. After 4 days the flowers in lots 1 and 2 were still in excellent condition and after 7 days the flowers in lot 1 were still in good condition, however, by the end of the 3 day the flowers dipped in plain water had deteriorated. These tests show that it is possible according to the invention to treat the flowers immediately after cutting and then process the flowers for special occasions such as corsages, wreaths and the like as much as 2 or 3 days earlier than untreated flowers. Alternatively, if so treated and prepared immediately after cutting and just before use the flowers will remain beautiful for several days longer while in use or subsequent storage.

V. Application To Cut Vegetables

In connection with cut leafy vegetables, tests have been run on turnip greens and collards to increase storability and improve market condition. In the case of turnip greens, unbiased samples of turnip greens from the same lot were prepared for treatment. One lot of the samples was not treated for control purposes. Sample lot 1 immediately after cutting was dipped for 30 seconds in a solution of magnesium carbonate of 1.8 gram in 1 gallon of water and then placed in an aereated plastic bag for storage. Lot 2 of the samples was dipped immediately after cutting for 30 seconds in a solution of magnesium carbonate having a concentration of 0.9 gram in 2 gallons of water. All lot samples were placed in a produce storage chamber for 24 days at 34° F. At the end of the test the samples were removed from the bags and rated as to color and per cent firmness. The control or untreated turnip greens had badly yellowed, had 0 percent firmness and the sample was "rotten". By "percent firmness" is meant the amount of the sample that remained firm, edible and saleable. Sample lot 1 had a good green color, however, it was only 10 percent in firmness and really was poorly kept. Sample lot 2 treated with magnesium carbonate was placed under the same conditions and possessed good green color and was 80 percent firm. The lot not treated was not marketable after the 6 day, however, lot 2 was marketable on the 12 day. The concentration of the solution used in the treatment of lot 1 was stronger, approximately four times, than the concentration of the solution used in the treatment of lot 2 which indicates there is an optimum concentration. These tests nevertheless conclusively show the improvement in the treatment of cut leafy vegetables and obviously greatly improve and provide for mass production harvesting.

In a test conducted with collards, several sample lots were used. The control lot was left untreated, except for water dip for control. Sample lot 1 was dipped immediately after cutting for 30 seconds in the magnesium carbonate saturated solution and then placed in a ventilated bag. Sample lot 2 was dipped immediately after cutting for 30 seconds in the magnesium carbonate saturated solution, washed with plain water and then placed in a ventilated bag. Sample lot 3 was dipped immediately after cutting in a one-tenth magnesium carbonate solution for 30 seconds and placed in a ventilated bag. Sample lot 4 was dipped immediately after cutting in a magnesium carbonate saturated solution for 30 seconds washed with plain water and then placed in a ventilated bag. Sample lot 5 was dipped immediately after cutting in a magnesium carbonate saturated solution for 30 seconds and then placed in a ventilated bag without washing. All of these sample lots were placed in ventilated bags and held for 25 days in a produce storage chamber at 34° F. When removed from the cooler, all samples were rated as to odor, stem color, marketability and leaf color. They were placed in a room at an average of 60° F. without the plastic cover. They were then graded daily as to relative position with respect to market desirability. The first place was given a rating grade of 7 and the last position was given a grade of 1. The grades for each treatment were added for a final grade. The highest grade would be 64 for 8 ratings.

After 25 days in cool storage, the results found the control lot strong in odor, clear stem color, fair marketability, fair leaf color and a total grade of 12 for 8 days storage at average room temperature. Sample lot 1 was found to have fresh odor, clear stem color, excellent marketability, good leaf color and a total grade of 19 for 8 days storage at average room temperature. Sample lot 2 had a slight odor, clear stem color, excellent marketability, excellent leaf color and a total grade of 33 for 8 days storage at average room temperature. Sample lot 3 had a slight odor, clear stem color, excellent marketability, excellent leaf color and a total grade of 45 for 8 days storage at average room temperature. Sample lot 4 had a fresh odor, clear stem color, excellent marketability, excellent leaf color and a total grade of 50 for 8 days storage at average room temperature. Sample lot 5 had a fresh odor, clear stem color, excellent marketability, excellent leaf color and a total grade of 60 after 8 days of average room temperature. Results show that sample lot 5 was far superior and was successful in increasing storability. Treatment 5 was a better treatment.

All of the tests indicate that the desired results are best achieved when the subject, i.e. flower, tree or vegetable, is treated immediately after cutting. As a practical matter this time of treating will necessarily vary with the work conditions, the weather, etc. and the treatment in many cases will be found effective even if applied several days after cutting. The term "immediately after cutting" is thus to be interpreted in the claims.

In the case of cut trees and cut flowers it is desireable in treating to fully submerge at least the stump of the tree or flower in the treating material. With both trees and flowers, the entire tree or flower may be submerged though dipping of the stump portions only is generally all that is required. In the case of the leafy vegetables, it is generally preferably to spray or dip both sides of each leaf to obtain the best results.

Having described the invention, what is claimed is:

1. The method of treating a subject selected from the group including seeds, bulbs, rooted plants to be transplanted, growing plants, cut flowers, cut trees and cut vegetables whereby to increase the hygroscopic character thereof comprising the step during a period of low moisture condition of treating the selected subject with a material chosen from the group consisting of magnesium carbonate, sodium citrate, magnesium chloride, magnesium pyrophosphate and citric acid, said material being adapted following treatment to substantially improve the hygroscopic character of such selected subject.

2. The method of claim 1 wherein said material is in an aqueous solution.

3. The method of claim 1 wherein said material is in powder form.

4. The method of claim 1 wherein said material is applied mixed with a material selected from the group consisting of an insecticide, inoculant, and fungicide.

5. The method of claim 2 wherein said subject is hard seeds and said solution is in the concentration of substantially 1 ounce per 8 gallons of water.

6. The method of claim 2 wherein said subject is soft seeds and said solution is in the concentration of substantially one-fourth ounce per 8 gallons of water.

7. The method of claim 1 wherein said subject is seeds selected from the group consisting of tobacco, corn, lettuce, pepper, pole beans, soy beans, mustard, turnip, collard, tomato, cauliflower, cabbage, garden peas, cantaloupe, watermelon, cucumber, potato and peanuts.

8. The method of claim 1 wherein said subject constitutes flower seeds.

9. The method of claim 1 wherein said subject constitutes seeds, said material constitutes magnesium carbonate and said treating constitutes immersing the seeds in a solution of magnesium carbonate for approximately 1 minute followed by drying when stored and machine planted.

10. The method of claim 1 wherein said subject constitutes seeds, said material constitutes magnesium carbonate and said treating constitutes tumbling the seeds in said magnesium carbonate in powder form.

11. The method of claim 1 wherein said subject constitutes seeds, said material constitutes magnesium carbonate and said treating constitutes spraying the soil containing said seeds with said magnesium carbonate.

12. The method of claim 1 wherein said subject constitutes seeds, said material constitutes magnesium carbonate and said treating constitutes treating the seeds with another material selected from the group consisting of a fungicide and inoculant and containing said magnesium carbonate.

13. The method of claim 1 wherein said subject constitutes a subject selected from the group consisting of seeds and bulbs and said treating constitutes mixing the respective subject with said material in powder form.

14. The method of claim 1 wherein said subject constitutes seeds and said treating constitutes dipping the seeds for a substantially short time in said material in solution form.

15. The method of claim 2 wherein said subject constitutes plants and said treating constitutes spraying said solution on said plants.

16. The method of claim 3 wherein said subject constitutes plants and said treating constitutes dusting said powder on said plants.

17. A method for reducing the mortality of transplanted rooted plants comprising the steps of dipping the roots of such plants in an aqueous solution of a material selected from the group consisting of magnesium carbonate, sodium citrate, magnesium chloride, magnesium pyrophosphate and citric acid, said dipping being prior to transplanting and for a length of time sufficient to allow the solution to penetrate the roots and to a depth sufficient to cover the roots but insufficient to bring any bud or foliage portion of such plants in contact with with solution and then transplanting said plants in the normal way with said roots containing said solution.

18. The method of claim 17 wherein said material constitutes magnesium carbonate and said solution constitutes a substantially saturated magnesium carbonate water solution.

19. The method of claim 18 wherein said plants comprises tobacco plants.

20. The method of claim 19 wherein said solution is substantially in a concentration equivalent to 1 ounce of magnesium carbonate per 8 gallons of water.

21. The method of claim 17 wherein said plants comprise tobacco plants and wherein said depth is in the range of 2 to 3 inches.

22. The method of claim 20 wherein said depth is substantially in the range of 2 to 3 inches.

23. The method of claim 18 where said plants comprise plants selected from the group which consists of tobacco, tomato, collard, zinnias, chrysanthemums, salvia, impatiens and petunias.

24. The method of claim 18 wherein said dipping time is at least 10 seconds.

25. The method of claim 17 including the step following said transplanting and the beginning of growth of the transplant of spraying the transplanted plant with an amount of and for a sufficient time with a solution adapted to reduce the normal transpiration of such pant, such solution being a solution taken from the group consisting of magnesium carbonate solution and a sodium citrate solution.

26. The method of claim 17 including the step of storing the plants for a predetermined time following dipping and prior to transplanting.

27. A method for reducing the mortality of a rooted plant at the time of transplanting comprising the step of dipping immediately after pulling and prior to transplanting a portion of the plant selected from the root portion and the bud-foliage portion in an aqueous solution of a material consisting of magnesium carbonate, sodium citrate, magnesium chloride, magnesium pyrophosphate and citric acid, and while keeping the portion not dipped isolated from such solution maintaining the dipped portion in the solution for a substantially short time and then transplanting said plants in the normal way with said dipped portion containing said solution.

28. The method of preserving a subject selected from cut trees, flowers and leafy vegetables and giving such subject a hygroscopic character comprising the step of substantially immediately after cutting treating a selected portion of the subject with a material selected from the group consisting of magnesium carbonate, sodium citrate, magnesium chloride, magnesium pyrophosphate and citric acid.

29. The method of claim 28 wherein said material is magnesium carbonate and is in solution form.

30. The method of claim 28 wherein said material is magnesium carbonate and is in powder form.

31. The method of improving the effectiveness of insecticides in the nature of malathion, parathion and the like applied to infected growing plants during periods of low moisture conditions comprising the steps of mixing with such insecticides at the time of application to the plants of a material selected from the group consisting of magnesium carbonate, sodium citrate, magnesium chloride, magnesium pyrophosphate and citric acid and applying the mixture of insecticide and material to the plants.

32. The method of claim 31 wherein said insecticide is in powder form, said material is in powder form and said insecticide and material are applied to said plants by dusting.

33. The method of claim 31 wherein said insecticide is in aqueous solution form, said material is added to said solution and said solution is applied to said plants by spraying.

34. A method for reducing the mortality of transplanted rooted plants comprising the step of treating during a period of low moisture selected portions of the plant after pulling and prior to transplanting with a compound material in aqueous solution, said material having the character of that group consisting of magnesium carbonate, sodium citrate, magnesium chloride, magnesium pyrophosphate and citric acid with respect to supporting the process of imbibition and inducing premature shock in the plants so treated.

* * * * *

UNITED STATES PATENT OFFICE
CERTIFICATE OF CORRECTION

Patent No. 3,678,621　　　　　　　Dated July 25, 1972

Inventor(s) Robert M. Reams

It is certified that error appears in the above-identified patent and that said Letters Patent are hereby corrected as shown below:

Column 1, line 8, "749,799" should be -794,799-.

Column 5, line 17, "That" should be deleted.

Column 7, line 56, "even" should be -event-.

Column 8, line 32, "Selvin" should be -Sevin-.

Column 10, line 38, "6" should be -sixth-.

Column 10, line 39, "12" should be -twelfth-.

Column 12, line 32, the second occurrence of "with" should be -the-.

Signed and sealed this 6th day of February 1973.

(SEAL)
Attest:

EDWARD M. FLETCHER, JR.
Attesting Officer

ROBERT GOTTSCHALK
Commissioner of Patents